UNITED STATES PATENT OFFICE.

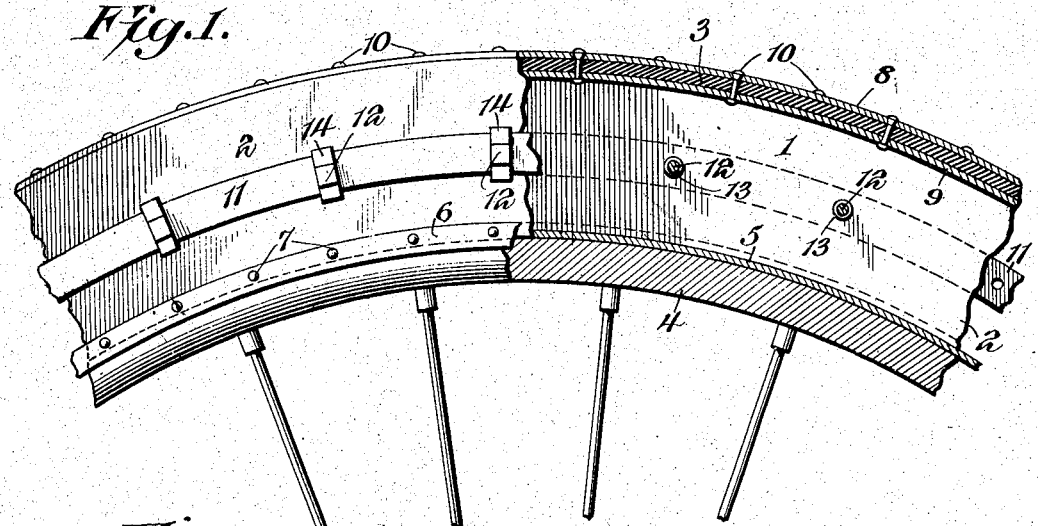

WILLIAM H. PARHAM, OF PADUCAH, KENTUCKY.

CUSHION-TIRE.

No. 827,321.  Specification of Letters Patent.  Patented July 31, 1906.

Application filed October 30, 1905. Serial No. 285,039.

*To all whom it may concern:*

Be it known that I, WILLIAM H. PARHAM, a citizen of the United States, residing at Paducah, in the county of McCracken and State of Kentucky, have invented a new and useful Cushion-Tire, of which the following is a specification.

The invention relates to improvements in cushion-tires.

The object of the present invention is to avoid the use of unreliable pneumatic tires and to enable the same to be readily made puncture-proof or non-collapsible from puncture and to provide a simple and thoroughly-reliable spring-metal hoop or cushion-tire designed for use on various kinds of wheels and adapted to afford the desired resiliency to suit the character of the wheel to which it is applied.

A further object of the invention is to provide a wheel of this character having adjustable means for varying the tension of the parts to increase the stiffness of the wheel when desired.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 5:
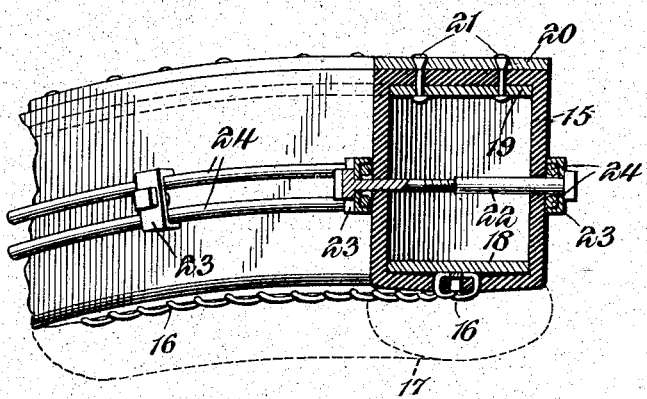
Figure 6:
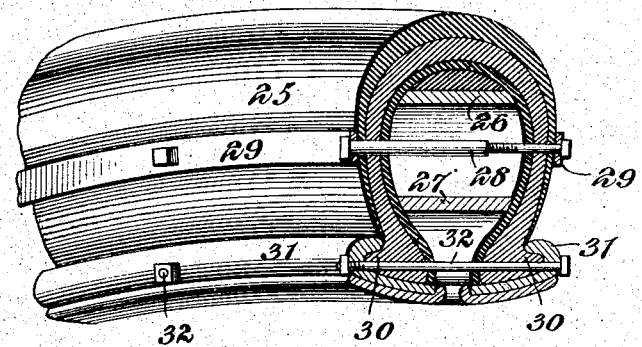
Figure 7:
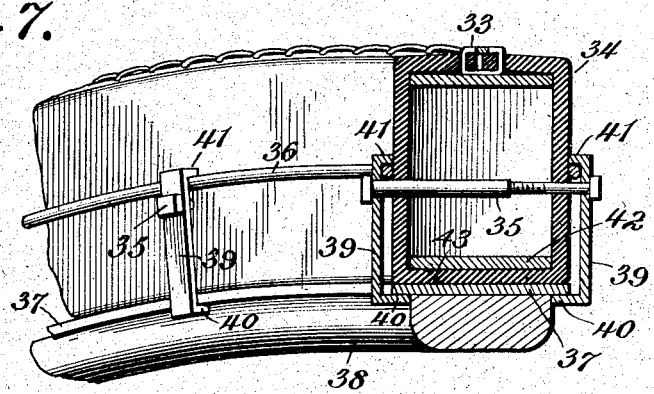

In the drawings, Figure 1 is an elevation, partly in section, of a portion of a wheel provided with a spring-hoop cushion-tire constructed in accordance with this invention. Fig. 2 is a sectional perspective view of a portion of the tire. Fig. 3 is an enlarged detail sectional view illustrating the construction of the transverse bolts for varying the tension of the tire. Fig. 4 is a detail view of one of the clip-plates of the transverse bolts. Fig. 5 is a sectional perspective view showing a spring-hoop cushion-tire laced at the wheel-base or felly portion. Fig. 6 is a similar view showing another form of the invention in which an ordinary pneumatic tube is converted into a spring-hoop cushion-tire. Fig. 7 is a sectional perspective view illustrating another form of the invention in which the tire is laced at the tread.

Like numerals of reference designate corresponding parts in all the figures of the drawings.

1 designates a substantially rectangular flexible tube or casing designed to be constructed of rubber, leather, fabric, or a combination of such materials and composed of compressible sides 2 and an outer transverse tread portion 3; but the flexible casing or tube may, as illustrated in Figs. 5 and 7 of the drawings, be also provided with an inner transverse wall or felly-engaging portion.

In the form shown in Figs. 1 to 3, inclusive, the sides of the tube or casing are secured to the felly or wheel-base 4 by interlocking them with a transverse hoop or ring 5, which is arranged on the felly or rim 4 and which extends laterally therefrom. The inner edges of the sides 2 are provided with angle rings or bands 6, which are L-shaped in cross-section and which fit against the outer faces and inner edges of the sides 2, as clearly illustrated in Fig. 2 of the drawings. The side portions of the angle or flanged ring 6 are secured to the sides of the casing or tube by rivets 7 or other suitable fastening devices, and the transversely-disposed portions or flanges of the angle rings or bands are engaged with the laterally-projecting portions of the hoop or ring 5.

The desired strength and resiliency is imparted to the tire by circular metal springs 8 and 9, arranged in the form of hoops and secured to the tread or outer portion of the flexible casing or tube 1 at the inner and outer faces thereof by means of rivets 10 or other suitable fastening devices, which pierce the inner and outer spring hoops or rings, as clearly shown in Fig. 2. The outer hoop or ring forms a metallic tread; but when it is desired to avoid friction and render the wheel noiseless either the outer or inner, or both, of the spring-metal hoops 8 and 9 may be covered with any suitable material or be embedded in the casing or tube 1. The rings or hoops 8 and 9 extend entirely across the tread portion of the flexible casing, and they impart sufficient strength to the tire to support the weight to which the wheel is subjected, and they also possess sufficient resiliency to cushion the load. The flexible casing or tube is also provided at opposite sides with exteriorly-arranged resilient rings or bands 11, which in practice are designed to be sufficiently thin to be highly resilient and which may be increased in number to insure greater strength.

Instead of employing a single ring or band 11 at each side of the flexible tube or casing two or more of such rings or bands may be used when additional strength is desired, and as this is obvious illustration thereof is deemed unnecessary. These resilient rings or bands 11 are connected by transverse adjusting devices adapted to compress the said flexible casing or tube to place the desired tension on the circular springs or hoops 8 and 9. These transverse adjusting devices, which are arranged at short intervals, each comprise a bolt 12 and an interiorly-threaded tubular member 13, which receives and is engaged by the threaded portion of the bolt. The bolt pierces one of the walls of the flexible casing and the intermediate ring or band 11 thereof and the tubular member pierces the opposite wall of the flexible tube or casing and the other ring or band 11. Each of the sections or members of the transverse fastening device is also preferably provided with a clip-plate 14 for embracing the intermediate rings or bands, as clearly shown in Figs. 2 and 3 of the drawings. These clip plates or members 14 may be omitted, if desired. The exteriorly-arranged rings or bands 11 enable the sides of the flexible tube or casing to be uniformly compressed, and by compressing the flexible tube or casing the circular springs or metal hoops 8 and 9 are placed under tension, and the desired stiffness is imparted to the tire. Although in Figs. 1 and 2 of the drawings the cushion-tire is shown applied to a wheel having wire spokes, yet it will be readily understood that the tire is applicable to all kinds of wheels.

In Fig. 5 of the drawings is illustrated a tire having a flexible tube or casing 15, provided with an inner wall composed of opposite portions connected by lacing, as clearly shown at 16. The laced edges of the flexible casing or tube are interposed between the felly 17 and a hoop or band 18, and the casing or tube 15 is provided at its tread portion with inner and outer resilient hoops or circular springs 19 and 20, which are connected by rivets 21, piercing the hoops or circular springs 19 and 20 and the tread portion of the flexible casing 15. The sides of the flexible tube or casing are connected by transversely-disposed adjusting devices 22, constructed similar to those before described and provided with clip-plates 23, in which are arranged resilient intermediate rings, bands, or hoops 24. These rings or hoops 24, which are arranged in pairs, are preferably in the form of narrow thin bands or heavy wires; but they may be of any preferred configuration and may be increased or diminished in number, according to the stiffness desired to support the tire and cushion the load.

In Fig. 6 of the drawings is illustrated another form of the invention in which a flexible tube or casing 25 is employed, the tube or casing 25 being an ordinary pneumatic-tire tube or casing of the clencher type converted into a spring-hoop cushion-tire. This tube or casing is provided with interiorly-arranged resilient metal inner and outer circular springs or hoops 26 and 27, and the sides of the tube or casing are connected by transversely-disposed adjusting devices 28, which pierce the side walls, and also intermediate exteriorly-arranged resilient rings or bands 29. The inner portion of the sides of the tube or casing are enlarged at 30 and extended laterally to engage a rim 31, having curved hoop-shaped edges. The enlarged portions 30 are secured to the rim by means of transverse bolts 32. This construction provides a resilient cushion or non-pneumatic tire which presents the appearance of an ordinary pneumatic tire. The essential features of the invention reside in the resilient metal hoops and the transverse adjusting devices which may be applied to various styles of pneumatic-tire tubes to convert the same into spring-hoop cushion-tires with comparatively little change.

In Fig. 7 of the drawings is illustrated another form of the invention in which a flexible tube or casing substantially rectangular in cross-section is employed. The tube or casing is laced at the tread at 33 and provided with interiorly-arranged resilient inner and outer circular metal rings or hoops 34 and 42, which support the tube or casing and binds it to the felly or wheel-base. The sides of the tube or casing are connected by transverse fastening devices 35 and are provided with exterior intermediate resilient bands or rings 36, which are in the form of light rods or heavy wires. The flexible tube or casing is seated on a metallic hoop or band 37, which extends laterally beyond the rim or felly portion 38 of the wheel and which also is engaged by elongated clip-plates 39. These clip-plates or clamping members, which are secured to the sides of the casing by the transverse fastening devices 35, have their ends bent inwardly at right angles to form inner and outer lugs or flanges 40 and 41. The inner lugs or flanges 40 engage and interlock the flexible casing or tube with the inner hoop or band 37 and the outer lugs or flanges 41 engage the intermediate resilient hoops or bands 36. It will be readily seen that this form of the invention provides a light, noiseless, highly-resilient cushion-tire the stiffness of which can be readily and easily increased by the addition of one or more circular springs or hoops placed on the interior of the tube or casing within the space between the hoops 34 and 42 or by the addition of one or more pairs of resilient hoops or rings 36, arranged within the clip-plates 39 on the outside of the tube or casing between the flanges or lugs 40 and 41.

It will be seen that the improvements herein shown and described are applicable to a large variety of styles of tires and that either or all of the outer or inner circular hoops or rings may vary in size, configuration, and number to secure a tire of the desired strength and resiliency. Also it will be clearly seen that the circular springs or hoops are adapted to afford resiliency or cushioning effect to an ordinary pneumatic tire and that they will render the same puncture-proof and may be secured to them by any suitable means.

Having thus fully described my invention, what I claim as new, and desire to secure by Letters Patent, is—

1. A tire of the class described, comprising a flexible casing, a resilient hoop or ring arranged at the outer wall of the casing for sustaining the tread of the tire, and means for compressing the sides of the flexible casing to vary the tension of the resilient hoop or ring.

2. A tire of the class described, comprising a flexible casing, a resilient hoop or ring arranged at the outer wall of the casing for sustaining the tread of the tire, and a transverse adjusting device connecting the sides of the casing for compressing the same.

3. A tire of the class described, comprising a flexible casing, a resilient hoop or ring arranged at the outer wall of the casing for sustaining the tread of the tire, and a transversely-disposed adjusting device connecting the sides of the casing and composed of two threaded members, one of the members being tubular and receiving the other.

4. A tire, comprising a flexible casing having compressible sides, intermediate resilient rings or bands arranged at the sides of the casing, and a transverse adjusting device connecting the rings or bands and arranged to compress the sides of the casing.

5. A tire, comprising a flexible casing, rings or bands arranged on the exterior of the casing, and transverse adjusting devices piercing the sides of the casing and provided with means for engaging the said rings or bands for exerting a uniform exterior pressure on the sides of the casing.

6. A tire, comprising a flexible casing, intermediate rings or bands arranged at the sides of the casing, a transverse adjusting device, and clip plates or members secured to the tire by the adjusting device and engaging the intermediate rings or bands.

7. A tire, comprising a hoop or band designed to be seated on the rim or felly of a wheel, a flexible casing, a resilient hoop or ring arranged at the outer or tread portion of the flexible casing, means for compressing the sides of the casing, and means for engaging the casing with the first-mentioned hoop or ring.

8. A tire, comprising a hoop or band designed to be seated on the rim or felly of a wheel, a flexible casing, a resilient hoop or ring arranged at the outer or tread portion of the flexible casing, means for compressing the sides of the casing, and flanged rings or bands secured to the sides of the casing and engaging the first-mentioned hoop or ring.

9. A tire, comprising a casing substantially rectangular in cross-section, an inner hoop or ring designed to be fitted on the rim or felly portion of the wheel, a resilient hoop or ring arranged at the outer portion of the flexible casing for sustaining the tread, intermediate rings or bands, transverse adjusting devices connecting the intermediate rings or bands for compressing the sides of the tire, and means connected with the sides of the flexible casing for engaging the same with the inner hoop or ring.

10. A tire of the class described, comprising a flexible casing, a resilient hoop or ring arranged at the inner face of the outer wall of the casing for sustaining the tread of the tire, and means for compressing the sides of the flexible casing to vary the tension of the resilient hoop or ring.

In testimony that I claim the foregoing as my own I have hereto affixed my signature in the presence of two witnesses.

WILLIAM H. PARHAM.

Witnesses:
C. C. ROSE,
W. B. WALTERS.